United States Patent
Yang

(10) Patent No.: US 11,791,696 B2
(45) Date of Patent: Oct. 17, 2023

(54) MOTOR CONTROLLER

(71) Applicant: Global Mixed-mode Technology Inc., Hsin-Chu (TW)

(72) Inventor: Chia-Tai Yang, Hsinchu County (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 542 days.

(21) Appl. No.: 17/092,327

(22) Filed: Nov. 9, 2020

(65) Prior Publication Data

US 2022/0149704 A1  May 12, 2022

(51) Int. Cl.
*H02K 11/21* (2016.01)
*H02K 11/215* (2016.01)
*H02P 27/08* (2006.01)
*H02P 6/16* (2016.01)

(52) U.S. Cl.
CPC ............ *H02K 11/215* (2016.01); *H02P 6/16* (2013.01); *H02P 27/085* (2013.01)

(58) Field of Classification Search
CPC .................................... H02P 6/16; H02P 6/20
See application file for complete search history.

(56) References Cited

U.S. PATENT DOCUMENTS

| | | | | |
|---|---|---|---|---|
| 9,793,839 B2 * | 10/2017 | Chen | ......................... | H02P 6/20 |
| 2017/0093313 A1 * | 3/2017 | Brown | ..................... | H02P 27/08 |
| 2017/0264222 A1 * | 9/2017 | Chen | ......................... | H02P 6/20 |

FOREIGN PATENT DOCUMENTS

| | | | | | |
|---|---|---|---|---|---|
| CN | 1518205 | A | | 8/2004 | |
| CN | 106533006 | A * | 3/2017 | | ........... H02K 1/2746 |
| TW | 201448447 | A | | 12/2014 | |
| TW | 201947865 | A | | 12/2019 | |

OTHER PUBLICATIONS

CN-106533006-A, Wu, all pages (Year: 2017).*

* cited by examiner

Primary Examiner — Naishadh N Desai
(74) Attorney, Agent, or Firm — Winston Hsu

(57) ABSTRACT

A motor controller comprises a switch circuit, a driving circuit, a pulse width modulation circuit, and a Hall sensor. The switch circuit is coupled to a three-phase motor for driving the three-phase motor. The driving circuit generates a plurality of control signals to control the switch circuit. The pulse width modulation circuit generates a pulse width modulation signal to the driving circuit. The pulse width modulation signal has a duty cycle. The Hall sensor is coupled to the pulse width modulation circuit for generating a Hall signal. When the duty cycle is less than an alignment duty cycle, the motor controller generates an alignment waveform based on the initial value of the Hall signal. The alignment waveform may be a part of an M-shaped waveform.

11 Claims, 3 Drawing Sheets

MOTOR CONTROLLER

BACKGROUND OF THE INVENTION

1. Field of the Invention

The present invention relates to a motor controller, and more particularly, to a motor controller which is capable of starting a three-phase motor by one Hall sensor.

2. Description of the Prior Art

Conventionally, there are two driving methods for driving a three-phase motor. The first driving method uses the Hall sensor for switching phases, so as to drive the three-phase motor. The second driving method does not use the Hall sensor to drive the three-phase motor. In early days it is common to use three Hall sensors to drive the three-phase motor. Recently in order to decrease the cost of the system and solve the matching problem regarding three Hall sensors, it is prevailing to use merely one Hall sensor to drive the thee-phase motor. However, since it is impossible to obtain the precise fan position by merely one Hall sensor, it is needed to drive the three-phase motor smoothly by a start method.

U.S. Pat. No. 9,793,839 discloses a motor control circuit which uses one Hall sensor to sense the positions of the magnetic poles of the three-phase motor, and to execute a phase switching mechanism by a start controller and an operation controller. So that the motor control circuit drives the three-phase motor from a start state to a normal operation state. In the start state, the start controller controls the switching time and controls storage to transmit the digital models of the phase switching to the operation controller. The operation controller executes the phase switching of the full-bridge circuit according to the received digital models, to drive the three-phase motor. In the normal operation state, the state controller stops transmitting the digital models of the phase switching to the operation controller. The operation controller captures six digital models in sequence once every switching time, and accordingly executes the phase switching of the full-bridge circuit, to drive the three-phase motor. However, the start method is too ideal and it is inconvenient to match the three-phase motor, such that the difficulty in starting the three-phase motor increases and the success rate of starting the three-phase motor decreases.

SUMMARY OF THE INVENTION

According to one embodiment of the present invention, a motor controller which is capable of starting a three-phase motor by one Hall sensor is provided. The motor controller may increase the success rate of starting the three-phase motor greatly. The motor controller is used for driving the three-phase motor, where the three-phase motor has a first coil, a second coil, and a third coil. The motor controller comprises a switch circuit, a driving circuit, a pulse width modulation circuit, and a Hall sensor. The switch circuit is coupled to the three-phase motor for driving the three-phase motor. The switch circuit comprises a first terminal, a second terminal, and a third terminal, where the first terminal, the second terminal, and the third terminal respectively provides a first driving signal, a second driving signal, and a third driving signal for driving the three-phase motor. The driving circuit generates a plurality of control signals to control the switch circuit. The pulse width modulation circuit generates a pulse width modulation signal to the driving circuit. The pulse width modulation signal has a duty cycle. The Hall sensor is coupled to the pulse width modulation circuit, so as to detect a magnetic pole position of the three-phase motor and generate a Hall signal to the pulse width modulation circuit for switching phases.

According to one embodiment of the present invention, the start method of the three-phase motor may have four steps as follows:

1. In order to start the three-phase motor smoothly, the duty cycle of the pulse width modulation signal starts from 0 and then increases gradually. When the duty cycle is less than an alignment duty cycle, the motor controller generates an alignment waveform based on the initial value of the Hall signal. The first time point is the time point when the duty cycle is equal to the alignment duty cycle. The alignment waveform may be a part of an M-shaped waveform.

2. When the duty cycle is greater than the alignment duty cycle, the motor controller generates a series of pre-determined waveforms respectively to the first driving signal, the second driving signal, and the third driving signal during a first mandatory phase switching time, so as to enable the three-phase motor to get a first phase switching time point, where the first phase switching time point is the time point when the first level variation of the Hall signal occurs. The first phase switching time point is greater than the first time point. The pre-determined waveform may be a part of the M-shaped waveform.

3. When the first phase switching time point appears, the motor controller generates a plurality of waveforms which correspond to the first phase switching time point respectively to the first driving signal, the second driving signal, and the third driving signal. Then the motor controller generates a series of pre-determined waveforms respectively to the first driving signal, the second driving signal, and the third driving signal during a second mandatory phase switching time, so as to enable the three-phase motor to get a second phase switching time point, where the second phase switching time point is the time point when the second level variation of the Hall signal occurs. The second phase switching time point is greater than the first phase switching time point. The pre-determined waveform may be a part of the M-shaped waveform. The motor controller is operated in a start mode before the second phase switching time point.

4. When the second phase switching time point appears, the motor controller generates a plurality of waveforms which correspond to the second phase switching time point respectively to the first driving signal, the second driving signal, and the third driving signal. The motor controller is operated in a normal driving mode after the second phase switching time point. The motor controller may get an initial phase switching time and a third phase switching time point based on the first phase switching time point and the second phase switching time point, where the third phase switching time point is the time point when the third level variation of the Hall signal occurs. The third phase switching time point is greater than the second phase switching time point. The motor controller may increase the success rate of starting the three-phase motor greatly by the four-step start method.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
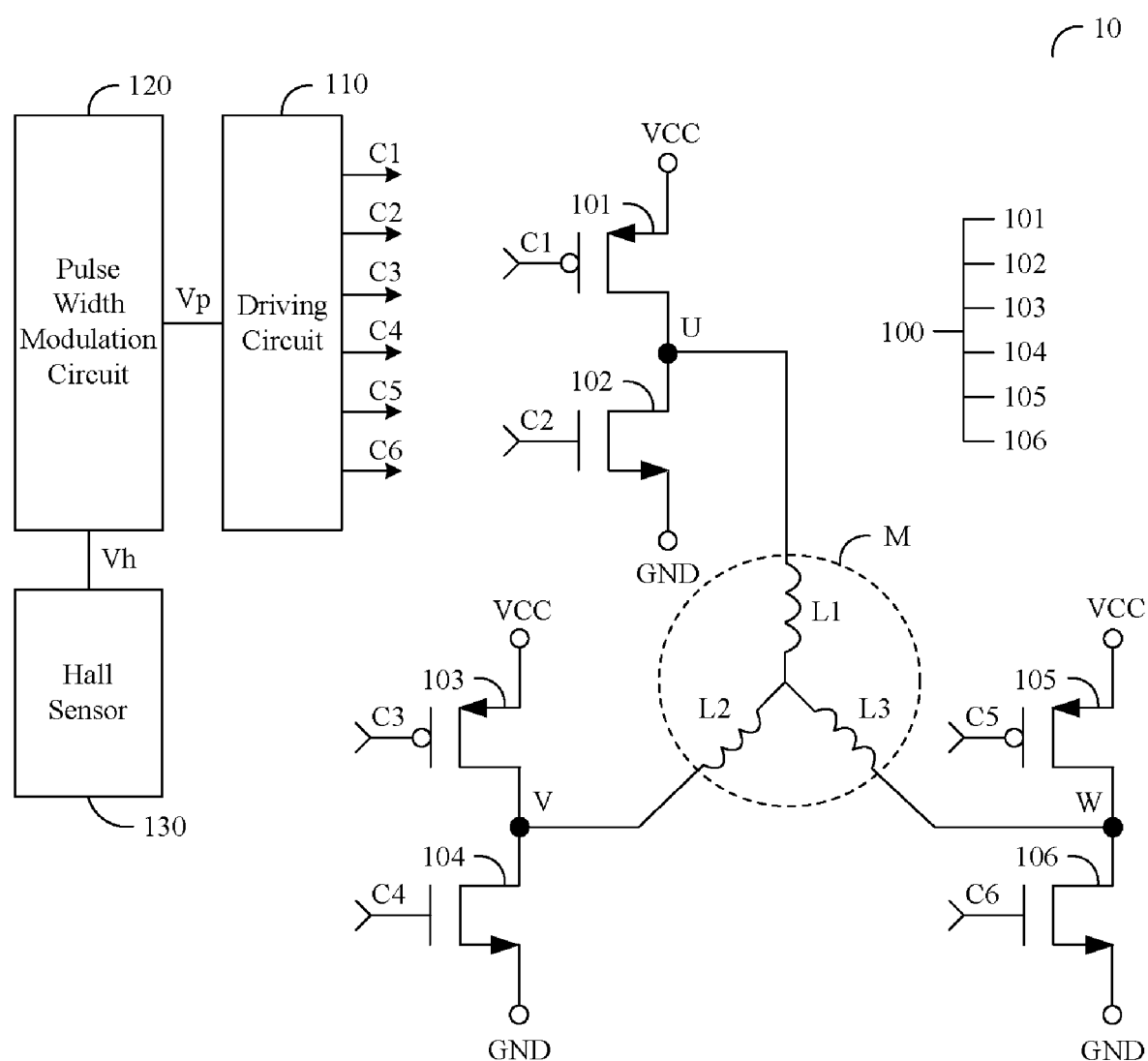
FIG. 1 is a circuit diagram showing a motor controller according to one embodiment of the present invention.

FIG. 1 is a circuit diagram showing a motor controller 10 according to one embodiment of the present invention. The motor controller 10 is used for driving a three-phase motor M, where the three-phase motor M has a first coil L1, a second coil L2, and a third coil L3. The motor controller 10 comprises a switch circuit 100, a driving circuit 110, a pulse width modulation circuit 120, and a Hall sensor 130. The switch circuit 100 includes a first transistor 101, a second transistor 102, a third transistor 103, a fourth transistor 104, a fifth transistor 105, a sixth transistor 106, a first terminal U, a second terminal V, and a third terminal W, where the switch circuit 100 is coupled to the three-phase motor M for driving the three-phase motor M. The first terminal U, the second terminal V, and the third terminal W respectively provides a first driving signal Su, a second driving signal Sv, and the third driving signal Sw for driving the three-phase motor M. The first transistor 101 is coupled to a terminal VCC and the first terminal U while the second transistor 102 is coupled to the first terminal U and a terminal GND. The third transistor 103 is coupled to the terminal VCC and the second terminal V while the fourth transistor 104 is coupled to the second terminal V and the terminal GND. The fifth transistor 105 is coupled to the terminal VCC and the third terminal W while the sixth transistor 106 is coupled to the third terminal W and the terminal GND. Each of the first transistor 101, the third transistor 103, and the fifth transistor 105 may be a p-type MOSFET. Each of the second transistor 102, the fourth transistor 104, and the sixth transistor 106 may be an n-type MOSFET.

One terminal of the first coil L1 is coupled to the first terminal U. One terminal of the second coil L2 is coupled to the second terminal V. One terminal of the third coil L3 is coupled to the third terminal W. Furthermore, another terminal of the first coil L1 is coupled to another terminal of the second coil L2 and another terminal of the third coil L3. That is to say, the first coil L1, the second coil L2, and the third coil L3 form a Y-shaped configuration. The driving circuit 110 generates a first control signal C1, a second control signal C2, a third control signal C3, a fourth control signal C4, a fifth control signal C5, and a sixth control signal C6 for respectively controlling the ON/OFF states of the first transistor 101, the second transistor 102, the third transistor 103, the fourth transistor 104, the fifth transistor 105, and the sixth transistor 106. The pulse width modulation circuit 120 generates a pulse width modulation signal Vp to the driving circuit 110, where the pulse width modulation signal Vp is used for adjusting the speed of the three-phase motor M. The pulse width modulation signal has a duty cycle. The Hall sensor 130 is coupled to the pulse width modulation circuit 120, so as to detect a magnetic pole position of the three-phase motor M and generate a Hall signal Vh to the pulse width modulation circuit 120 for switching phases. Since people of ordinary skill in the technology field should realize the method to drive the three-phase motor M, the detailed description is omitted.

Figure 2:
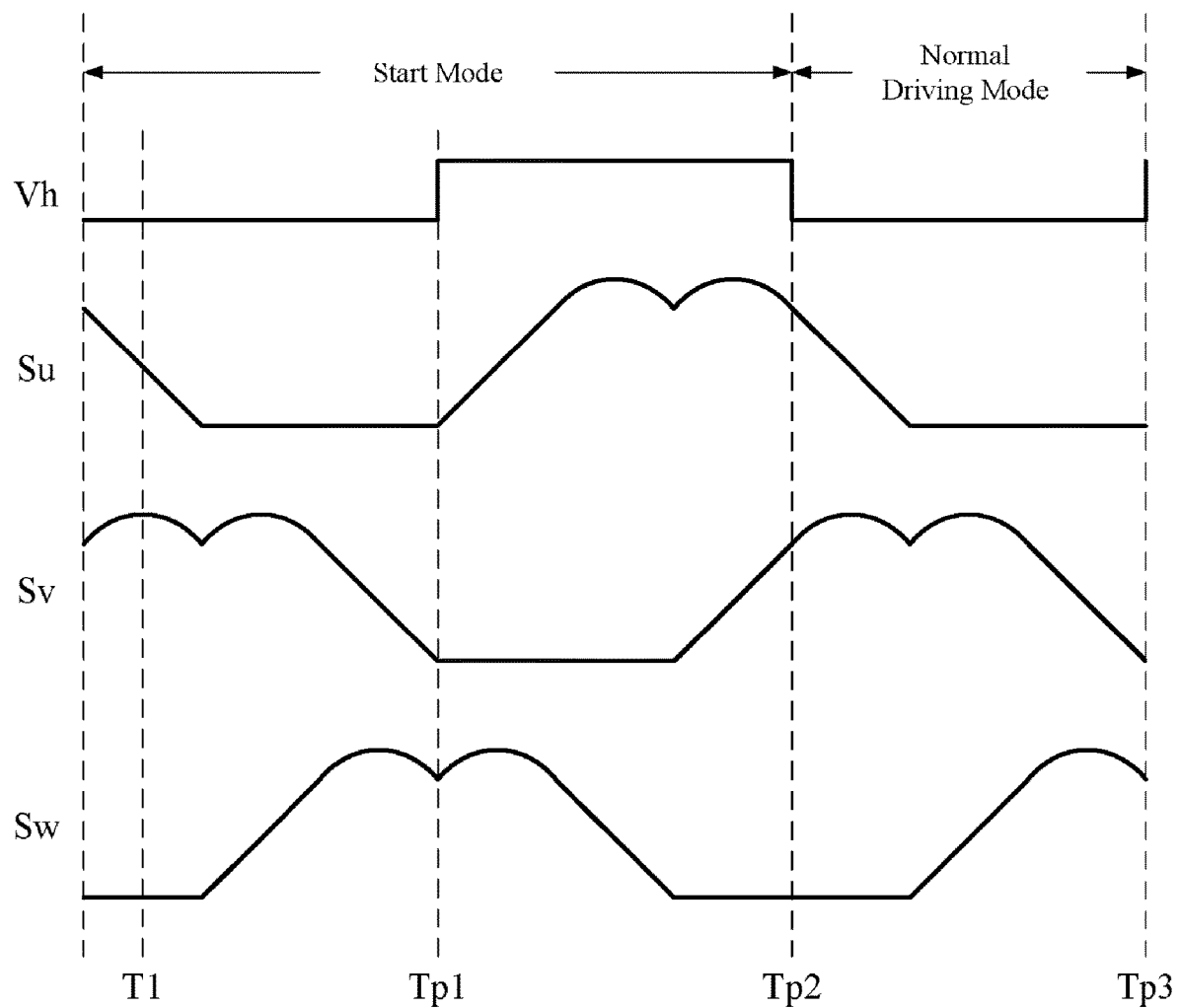
FIG. 2 is a first timing chart according to one embodiment of the present invention.
Figure 3:
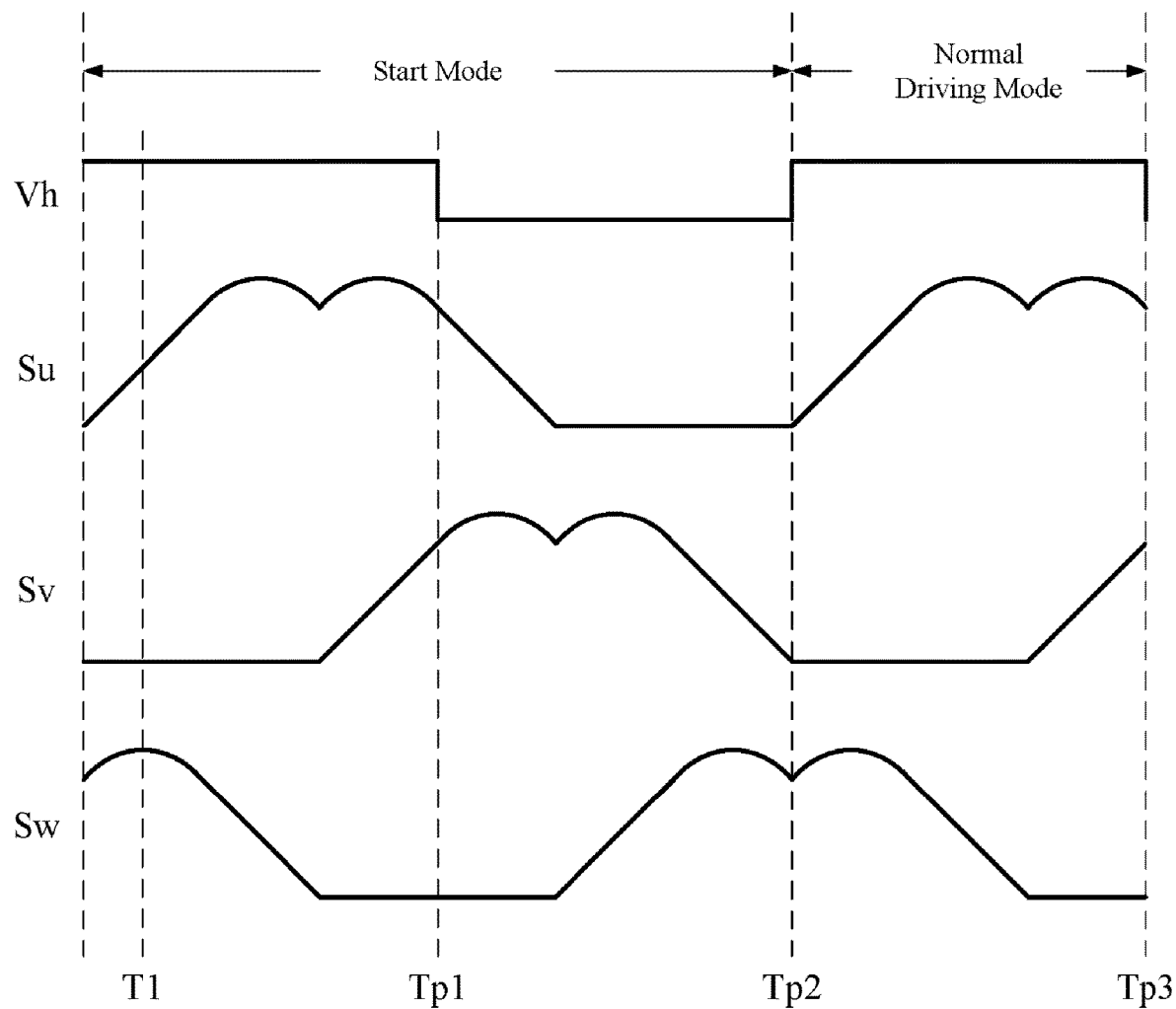
FIG. 3 is a second timing chart according to one embodiment of the present invention.

According to one embodiment of the present invention, the start method of the three-phase motor M may have four steps as follows:

1. In order to start the three-phase motor M smoothly, the duty cycle of the pulse width modulation signal Vp starts from 0 and then increases gradually. When the duty cycle is less than an alignment duty cycle, the motor controller 10 generates different alignment waveforms based on the initial value of the Hall signal Vh. FIG. 2 is a first timing chart according to one embodiment of the present invention. The first timing chart shows the waveform of the first driving signal Su, the waveform of the second driving signal Sv, and the waveform of the third driving signal Sw generated by the motor controller 10 when the initial value of the Hall signal is at a low level. The first time point T1 is the time point when the duty cycle is equal to the alignment duty cycle. FIG. 3 is a second timing chart according to one embodiment of the present invention. The second timing chart shows the waveform of the first driving signal Su, the waveform of the second driving signal Sv, and the waveform of the third driving signal Sw generated by the motor controller 10 when the initial value of the Hall signal is at a high level. As shown in FIG. 2 and FIG. 3, the alignment waveform may be a part of an M-shaped waveform.

2. When the duty cycle is greater than the alignment duty cycle, the motor controller 10 generates a series of pre-determined waveforms respectively to the first driving signal Su, the second driving signal Sv, and the third driving signal Sw during a first mandatory phase switching time, so as to enable the three-phase motor M to get a first phase switching time point Tp1, where the first phase switching time point Tp1 is the time point when the first level variation of the Hall signal Vh occurs. The first phase switching time point Tp1 is greater than the first time point T1. As shown in FIG. 2 and FIG. 3, the pre-determined waveform may be a part of the M-shaped waveform.

3. When the first phase switching time point Tp1 appears, the motor controller 10 generates a plurality of waveforms which correspond to the first phase switching time point Tp1, respectively to the first driving signal Su, the second driving signal Sv, and the third driving signal Sw. Then the motor controller 10 generates a series of pre-determined waveforms respectively to the first driving signal Su, the second driving signal Sv, and the third driving signal Sw during a second mandatory phase switching time, so as to enable the three-phase motor M to get a second phase switching time point Tp2, where the second phase switching time point Tp2 is the time point when the second level variation of the Hall signal Vh occurs. The second phase switching time point Tp2 is greater than the first phase switching time point Tp1. As shown in FIG. 2 and FIG. 3, the pre-determined waveform may be a part of the M-shaped waveform. The motor controller is operated in a start mode before the second phase switching time point Tp2.

4. When the second phase switching time point Tp2 appears, the motor controller 10 generates a plurality of waveforms which correspond to the second phase switching time point Tp2, respectively to the first driving signal Su, the second driving signal Sv, and the third driving signal Sw. The motor controller 10 is operated in a normal driving mode after the second phase switching time point Tp2. The motor controller 10 may get an initial phase switching time and a third phase switching time point Tp3 based on the first phase switching time point Tp1 and the second phase switching time point Tp2, where the third phase switching time point Tp3 is the time point when the third level variation of the Hall signal Vh occurs. The third phase switching time point Tp3 is greater than the second phase switching time point Tp2. The motor controller 10 may increase the success rate of starting the three-phase motor M greatly by the four-step start method.

While the present invention has been described by the preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor controller configured to drive a motor, wherein the motor has a first coil, a second coil, and a third coil, and the motor controller comprises:
a switch circuit, coupled to the three-phase motor, wherein the switch circuit comprises a first terminal, a second terminal, a third terminal, a first transistor, a second transistor, a third transistor, a fourth transistor, a fifth transistor, and a sixth transistor, the first transistor is coupled to a fourth terminal and the first terminal, the second transistor is coupled to a fifth terminal and the first terminal, the third transistor is coupled to the fourth terminal and the second terminal, the fourth transistor is coupled to the fifth terminal and the second terminal, the fifth transistor is coupled to the fourth terminal and the third terminal, the sixth transistor is coupled to the fifth terminal and the third terminal, and the first terminal, the second terminal, and the third terminal respectively provides a first driving signal, a second driving signal, and a third driving signal for driving the three-phase motor;
a driving circuit, configured to generate a plurality of control signals to control the switch circuit;
a pulse width modulation circuit, configured to generate a pulse width modulation signal to the driving circuit, wherein the pulse width modulation signal has a duty cycle; and
a Hall sensor, configured to generate a Hall signal to the pulse width modulation circuit, wherein when the duty cycle is less than an alignment duty cycle, the motor controller generates an alignment waveform based on an initial value of the Hall signal.

2. The motor controller of claim 1, wherein the alignment waveform is a part of an M-shaped waveform.

3. The motor controller of claim 1, wherein a terminal of the first coil is coupled to the first terminal, a terminal of the second coil is coupled to the second terminal, and a terminal of the third coil is coupled to the third terminal.

4. The motor controller of claim 1, wherein when the duty cycle is greater than the alignment duty cycle, the motor controller generates a series of pre-determined waveforms respectively to the first driving signal, the second driving signal, and the third driving signal during a first mandatory phase switching time, so as to enable the three-phase motor to get a first phase switching time point.

5. The motor controller of claim 4, wherein the pre-determined waveform is a part of an M-shaped waveform.

6. The motor controller of claim 4, wherein when the first phase switching time point appears, the motor controller generates a plurality of waveforms which correspond to the first phase switching time point respectively to the first driving signal, the second driving signal, and the third driving signal.

7. The motor controller of claim 6, wherein the motor controller generates a series of pre-determined waveforms respectively to the first driving signal, the second driving signal, and the third driving signal during a second mandatory phase switching time, so as to enable the three-phase motor to get a second phase switching time point, and the second phase switching time point is greater than the first phase switching time point.

8. The motor controller of claim 7, wherein the motor controller is operated in a start mode before the second phase switching time point.

9. The motor controller of claim 8, wherein when the second phase switching time point appears, the motor controller generates a plurality of waveforms which correspond to the second phase switching time point respectively to the first driving signal, the second driving signal, and the third driving signal.

10. The motor controller of claim 9, wherein the motor controller is operated in a normal driving mode after the second phase switching time point.

11. The motor controller of claim 10, wherein the motor controller get an initial phase switching time and a third phase switching time point based on the first phase switching time point and the second phase switching time point, and the third phase switching time point is greater than the second phase switching time point.

* * * * *